Sept. 24, 1940.   W. C. McWHIRTER ET AL   2,215,909
BRAKING MECHANISM
Original Filed June 17, 1937

Inventors
William C. McWhirter and
Edwin G. Little.
by
Their Attorney

Patented Sept. 24, 1940

2,215,909

UNITED STATES PATENT OFFICE 2,215,909

BRAKING MECHANISM

William C. McWhirter and Edwin G. Little, Wilkinsburg, Pa., assignors to The Union Switch & Signal Company, Swissvale, Pa., a corporation of Pennsylvania Original application June 17, 1937, Serial No. 148,706. Divided and this application November 19, 1938, Serial No. 241,470

10 Claims. (Cl. 188—171)

Our invention relates to braking mechanism, and more particularly to an electromagnetic brake for motor driven apparatus such, for example, as the apparatus utilized for operating railroad track switches.

In the operation of apparatus driven by electric motors, and particularly in the operation of railway switch operating apparatus it is desirable to prevent operation of the apparatus except when authorized power is applied, or when the apparatus is to be operated manually. One object of our invention is to provide an electromagnetic brake for accomplishing this result which brake may be located within the motor housing, and which is normally biased to a braking condition but which will become automatically released when power is applied to the motor, or may be released by manual means.

Other objects, purposes and characteristic features of our invention will appear as the description proceeds.

The present application is a division of our copending application for Letters Patent of the United States, Serial No. 148,706, filed on June 17, 1937, which has become Patent No. 2,183,164, Dec. 12, 1939, for Railway switch operating apparatus.

We shall describe one form of braking mechanism embodying our invention, and shall then point out the novel features thereof in claims.

Figure 1:
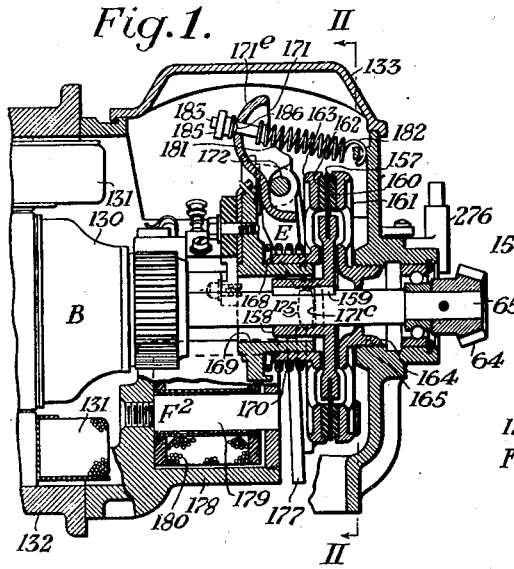
Figure 2:
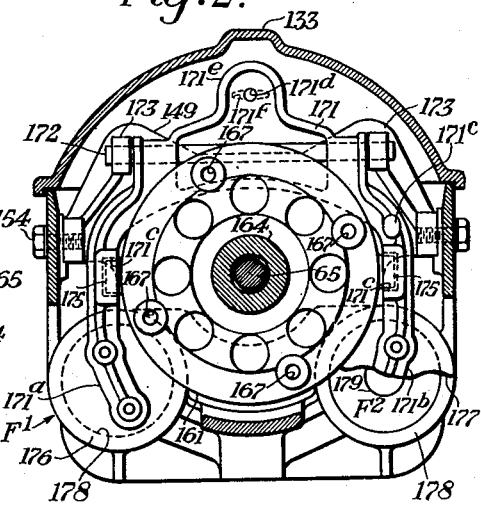
Figure 3:
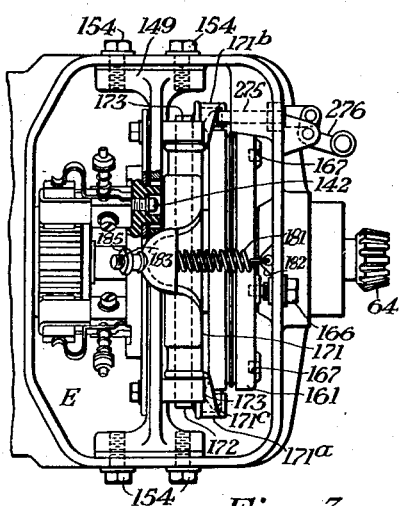

In the accompanying drawing, Fig. 1 is a fragmentary sectional view of an electric motor which is provided with brake mechanism embodying our invention. Fig. 2 is a sectional view taken on the line II—II of Fig. 1. Fig. 3 is a top plan view with cover removed of the brake mechanism shown in Fig. 2.

Similar reference characters refer to similar parts in all three views.

Referring to the drawing, we have here shown a magnetic brake E embodying our invention applied to a direct current motor B of the usual and well-known type comprising an armature 130 and field coils 131 disposed in an enclosing casing 132, one end of which is provided with a removable cover 133 through which convenient access to the commutator and brushes, as well as to the magnetic brake E, may be had.

The magnetic brake E comprises a brake disk 157 secured to a die casting 158 which is mounted for longitudinal sliding movement on the armature shaft 65, but which is constrained to rotate with the armature shaft by means of a feather key 159. One side of the brake disk 157 cooperates with a brake lining 160 secured to a stationary brake shoe 161, and the other side of this brake disk cooperates with a brake lining 162 secured to a movable brake shoe 163. The stationary brake shoe 161 is formed with an externally screw threaded hub 164, which hub is adjustably screwed into the inner end of the bearing opening 165 in the end wall of the motor casing 132. After the stationary brake shoe has once been adjusted to the desired position, it is subsequently maintained in this position by means of a locking screw 166 which is screwed through a threaded hole formed in the end wall of the motor casing, and which projects at its inner ends to one of a plurality of holes 167 provided in the outer face of the stationary brake shoe 161 in a position to receive the screw. The movable brake shoe 163 is provided with a hub 168 which is slidably mounted on a tubular support 169 formed on a supporting bracket 149 in concentric relation to the shaft 65. The supporting bracket 149 is secured to the opposite sides of the casing 132 of motor B by means of top bolts 154, as shown in Figs. 2 and 3. Surrounding the hub 168 and the tubular support 169 between the movable brake shoe and the support is a compressed coil spring 170 which constantly biases the movable brake shoe and the brake disk 157 toward the stationary brake shoe to braking positions in which the two brake linings 160 and 162 frictionally engage the brake disk 157. It will be apparent that when the brake linings are engaging the brake disk, rotation of the motor armature will be resisted.

The magnetic brake E also comprises an operating yoke 171 which is pivotally supported adjacent its upper end on a rod 172 mounted in spaced lugs 173 provided on the bracket 149, and the arms 171a and 171b of which extend downwardly past the opposite sides of the movable brake shoe 163 and are operatively connected intermediate their ends with the brake shoe by means of recesses 171c which are formed in the arms 171a and 171b, and which cooperate with diametrically opposite laterally projecting lugs 175 provided on the brake shoe at its outer edge. Secured to the lower ends of the arms 171a and 171b are armatures 176 and 177, respectively, which cooperate with magnets F1 and F2 located in the bottom of the motor casing. As will be seen from an inspection of Fig. 2, the magnets F1 and F2 are of the ironclad type, and each comprises a suitable cup-shaped shell 178 formed integrally with the motor casing, a central core member 179 secured at one end to the shell, and a winding 180 which surrounds the associated core member within the associated shell.

A tension spring 181 is hooked at one end onto a lug 182 provided on the end wall of the motor casing 130, and the other end of this spring is secured to a bolt 183 which extends with clearance through a hole 171d provided in a channel-shaped offset portion 171e formed on the upper end of the operating yoke 171. An adjusting nut 185 is screwed onto the outer end of the bolt 183 and formed on the inner end of this nut is a wedge-shaped surface 186 which cooperates with a notch 171f provided in the adjacent space of the offset portion, whereby when the nut 185 has been rotated to any position in which the wedge-shaped surface 186 aligns with the notch, the tension of the spring 181 will act to hold the wedge-shaped surface in the notch, and will thus prevent the nut from becoming unscrewed and destroying the adjustment. The spring 181 exerts a force on the operating yoke 171 which rotates the yoke in a clockwise direction, as viewed in Fig. 1, about the rod 172 to the position in which the recess 171c on the arms 171a and 171b receives the lug 175 on the movable brake shoe 163, and it will be seen, therefore, that the spring 181 serves to take up any clearance surrounding pin 172 in such a way that the air gap between the armatures 176 and 177 and the associated magnets F1 and F2 is held to the minimum. It will further be seen that due to the connection between the yoke 171 and the movable brake shoe 163, the force due to the spring 181 opposes the force which is exerted on the movable brake shoe by the spring 170, and it follows, therefore, that by adjusting the nut 185 to different positions, the resultant force which is exerted on the movable brake disk 175, and hence the braking force exerted by the brake may be quickly and conveniently varied to any desired value within the limits of the apparatus.

The windings 180 of the two magnets F1 and F2 are adapted to be connected in series in the operating circuit for the motor B in such manner that the motor current will flow in these windings, and it will be apparent that whenever the motor is deenergized, the spring 170 will actuate the brake to its braking position, and will thus cause the brake to oppose rotation of the motor armature. When, however, the motor becomes energized, the magnets F1 and F2 will attract the armatures 176 and 177, and will thus rotate the operating yoke 171 in a clockwise direction as viewed in Fig. 1. This rotation will act through the recesses 171c and lugs 175 to slide the movable brake shoe 163 toward the left, in opposition to the bias of the spring 170, to a position in which the pressure of the brake linings against the brake disk 157 is removed, thereby releasing the brake, and hence permitting the motor armature to rotate without opposition from the brake.

It will be readily understood that when the armatures 176 and 177 are moved to their attracted positions, the reluctances of the flux paths for the fluxes set up by the energized windings will be considerably reduced due to the decreased air gaps between the armatures and the magnets, and that, as a result, the current required to hold the armatures 176 and 177 in their attracted positions will be considerably less than that required to move them to their attracted positions. It is desirable that the magnets should not become energized at current values below that flowing in the motor circuit under starting conditions, in order to prevent improper operation of the motor due to stray currents which may be supplied to the motor, and it follows that by properly adjusting the air gaps which exist between the armatures and the magnets when the armatures occupy their deenergized positions, the characteristics of the brake may be so adjusted that it will be necessary for a current to flow in the windings 180 corresponding to the current which flows in the motor under normal starting conditions in order to release the brake, but that the brake will be maintained in its released position by a reduced current which is equal to the normal operating current for the motor. The necessary adjustment to accomplish this required result may be made by unscrewing the locking screw 166 and rotating the stationary brake shoe 161 in one direction or the other. This rotation will move the stationary shoe in an axial direction toward or away from the bracket 149, which movement, in turn, will cause a corresponding movement of the movable brake shoe 163, thereby causing the operating yoke 171 to rotate to a new position in which the armatures 176 and 177 are closer to, or farther away from, the magnets, as the case may be. After the necessary adjustment has been made, the stationary brake shoe may again be locked against rotation by means of the locking screw 166.

The magnetic brake further comprises means for at times manually releasing the brake. As here shown, these means comprise a push rod 275 (Fig. 3) which is slidably mounted in one end of the casing 132 of motor B, and which cooperates at its inner end with a boss 171c provided on the depending arm 171b of the clutch operating yoke 171 in such manner that by moving the rod 275 inwardly the yoke 171 can be rotated in a clockwise direction, as viewed in Fig. 1, in opposition to the bias of the spring 170 to the same position to which this yoke is moved when the electromagnets F1 and F2 become energized. The outer end of the push rod 175 is pivotally attached to one end of a bell crank lever 276 which is pivotally secured to the motor casing, whereby suitable means for manually operating the push rod may be operatively connected therewith to permit the brake to be readily released manually. This latter means is particularly useful when the motor is to be utilized to operate railway switch operating apparatus of the type described and claimed in our previously referred to application Serial No. 148,706 of which the present application is a division.

One advantage of braking mechanism embodying our invention is that adjustments which may be necessary due to wear of the brake lining, and to adapt the brake to different operating positions may be quickly and conveniently made.

Another advantage of braking mechanism embodying our invention is that the operation of the brake when the motor becomes energized is positive, thus insuring that the brake will not drag.

Although we have herein shown and described only one form of braking mechanism embodying our invention, it is understood that various changes and modifications may be made therein within the scope of the appended claims without departing from the spirit and scope of our invention.

Having thus described our invention, what we claim is:

1. In combination, an electric motor, a brake disk slidably mounted on the armature shaft and rotatable therewith, a brake shoe adjustably secured to the motor housing on one side of said disk, a second brake shoe disposed on the other side of said disk for sliding movement toward and away from said first disk, adjustable spring means for biasing said second brake shoe toward said fixed brake shoe to cause said brake shoes to frictionally engage said brake disk, a yoke pivotally mounted at one end and pivotally connected intermediate its ends with said brake shoe, a pair of armatures secured to the other end of said yoke, and two electromagnets cooperating with said two armatures, respectively, and effective when energized for moving said yoke to move said slidable brake shoe away from said fixed brake shoe in opposition to the bias of said spring means.

2. In combination, an electric motor, a brake disk slidably mounted on the armature shaft and rotatable therewith, a brake shoe adjustably secured to the motor housing on one side of said disk, a second brake shoe disposed on the other side of said disk for sliding movement toward and away from said first disk, adjustable spring means for biasing said second brake shoe toward said fixed brake shoe to cause said brake shoes to frictionally engage said brake disk, a yoke pivotally mounted at one end and pivotally connected intermediate its ends with said brake shoe, a pair of armatures secured to the other end of said yoke, and two electromagnets cooperating with said two armatures, respectively, and effective when energized for moving said yoke to move said slidable brake shoe away from said fixed brake shoe in opposition to the bias of said spring means, each said electromagnet being provided with a shell which is cast integrally with the motor frame.

3. In combination, an electric motor, a brake disk slidably mounted on the armature shaft and rotatable therewith, a stationary brake shoe disposed on one side of said brake disk and provided with a hub which is adjustably screwed into the inner end of the one armature bearing opening in the motor frame, a locking screw screwed through the motor frame and projecting at its inner end into a selected one of a plurality of holes provided in the outer face of said stationary brake shoe in positions to receive said screw in different positions of said stationary brake shoe to lock said stationary brake shoe in an adjusted position, a second brake shoe disposed on the other side of said disk for sliding movement toward and away from said disk, spring means for forcing said second brake shoe toward said stationary brake shoe to cause said brake shoes to frictionally engage said brake disk, a yoke pivotally mounted at one end and pivotally connected intermediate its ends with said second brake shoe and effective when rotated in one direction for moving said second brake shoe away from said fixed shoe in opposition to the bias of said spring means, and electromagnetic means cooperating with the other end of said yoke to actuate said yoke in a manner to move said second brake shoe away from said fixed shoe.

4. In combination, an electric motor, a brake disk slidably mounted on the armature shaft and rotatable therewith, a stationary brake shoe disposed on one side of said brake disk and provided with a hub which is adjustably screwed into the inner end of the one bearing opening in the motor frame, a locking screw screwed through the motor frame and projecting at its inner end into a selected one of a plurality of holes provided in the outer face of said stationary brake shoe in positions to receive said screw in different positions of said stationary brake shoe to lock said stationary brake shoe in an adjusted position, a second brake shoe disposed on the other side of said disk for sliding movement toward and away from said first disk, adjustable spring means for biasing said second brake shoe toward said stationary brake shoe to cause said brake shoes to frictionally engage said brake disk, a yoke pivotally mounted at one end and pivotally connected intermediate its ends with said second brake shoe, a pair of armatures secured to the other end of said yoke, and two electromagnets cooperating with said two armatures, respectively, and effective when energized for moving said yoke to move said second brake shoe away from said fixed brake shoe in opposition to the bias of said spring means.

5. In combination, an electric motor, a brake disk slidably mounted on the armature shaft and rotatable therewith, a fixed brake shoe on one side of said disk, a bracket secured to the motor frame and provided with a tubular support which surrounds the armature shaft on the side of said brake disk opposite to said fixed brake shoe, a second brake shoe provided with a hub which is slidably mounted on said tubular support, a compressed coil spring surrounding the hub of said second brake shoe and said tubular support between said bracket and said second brake shoe and effective for forcing said second brake shoe toward said fixed brake shoe to cause said brake shoes to frictionally engage said brake disk, a yoke pivotally mounted at one end and pivotally connected intermediate its ends with said second brake shoe and effective when rotated in one direction for moving said second brake shoe away from said fixed shoe in opposition to the bias of said spring means, and electromagnetic means cooperating with the other end of said yoke to actuate said yoke in a manner to move said second brake shoe away from said fixed shoe.

6. In combination, an electric motor, a brake disk slidably mounted on the armature shaft and rotatable therewith, a fixed brake shoe disposed on one side of said brake disk and provided with a hub which is adjustably screwed into the inner end of the one bearing opening in the motor frame, a locking screw screwed through the motor frame and projecting at its inner end into a selected one of a plurality of holes provided in the outer face of said fixed brake shoe in positions to receive said screw in different positions of said fixed brake shoe to lock said fixed brake shoe in an adjusted position, a bracket secured to the motor frame and provided with a tubular support which surrounds the armature shaft on the side of said brake disk opposite to said fixed brake shoe, a second brake shoe provided with a hub which is slidably mounted on said tubular support, a compressed coil spring surrounding the hub of said second brake shoe and said tubular support between said bracket and said second brake shoe and effective for forcing said second brake shoe toward said fixed brake shoe to cause said brake shoes to frictionally engage said brake disk, a yoke pivotally mounted at one end and pivotally connected intermediate its ends with said second brake shoe and effective when rotated in one direction for moving said second brake shoe away from said fixed shoe in opposition to the bias of said spring means, and electromagnetic means cooperating with the other end of said yoke to actuate said yoke in a manner to move said second brake shoe away from said fixed shoe.

7. In combination, an electric motor, a brake disk slidably mounted on the armature shaft and rotatable therewith, a fixed brake shoe on one side of said disk, a second brake shoe disposed on the other side of said disk for sliding movement toward and away from said disk, a first spring for forcing said second brake shoe toward said fixed brake shoe to cause said brake shoes to frictionally engage said brake disk, a yoke pivotally mounted at one end and pivotally connected intermediate its ends with said second brake shoe and effective when rotated in one direction for moving said second brake shoe away from said fixed shoe in opposition to the bias of said spring means, electromagnetic means cooperating with the other end of said yoke to actuate said yoke in a manner to move said second brake shoe away from said fixed shoe, and a second spring connected with said yoke in a direction to oppose said first spring, and means for varying the force exerted on said yoke by said second spring to vary the force with which said slidable brake shoe is biased toward said fixed brake shoe.

8. In combination, an electric motor, a brake disk slidably mounted on the armature shaft and rotatable therewith, a fixed brake shoe disposed on one side of said brake disk, a bracket secured to the motor frame and provided with a tubular support which surrounds the armature shaft with clearance on the side of said brake disk opposite to said fixed brake shoe, a second brake shoe having a hub slidably mounted on said tubular support for movement toward and away from said brake disk, a compressed coil spring disposed between said bracket and said second brake shoe and effective for biasing said second brake shoe toward said fixed brake shoe to cause said two brake shoes to frictionally engage said brake disk, a yoke pivotally secured to said bracket and pivotally connected with said second brake shoe, a tension spring secured at one end to the motor casing and at the other end to said yoke by means whereby the tension of said spring can be varied and acting through said yoke to exert on said second brake shoe a force which opposes and which is less than that due to said compressed coil spring, and electromagnetic means for actuating said yoke in a direction to move it away from said fixed brake shoe.

9. In combination, an electric motor, two electromagnets each provided with a shell which is cast integrally with the motor frame, and braking means for the armature shaft of said motor controlled by said electromagnets.

10. In combination, an electric motor, a brake disk slidably mounted on the armature shaft of said motor and constrained to rotate therewith, a fixed and a movable brake shoe cooperating with said brake disk on opposite sides thereof, means for biasing said movable shoe toward said fixed shoe to cause said shoes to frictionally engage said brake disk, two electromagnets each provided with a shell which is cast integrally with the motor frame, and means controlled by said electromagnets for at times moving said movable brake shoe away from said fixed brake shoe to release the brake formed by said two shoes and said disk.

WILLIAM C. McWHIRTER.
EDWIN G. LITTLE.